US008502655B2

(12) United States Patent
Deniau et al.

(10) Patent No.: US 8,502,655 B2
(45) Date of Patent: Aug. 6, 2013

(54) PROTOCOL MISINTERPRETATION AVOIDANCE APPARATUS AND METHOD FOR A TIRE PRESSURE MONITORING SYSTEM

(75) Inventors: Jean-Christophe Deniau, Fenton, MI (US); Brian J. Farrell, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 156 days.

(21) Appl. No.: 13/206,358

(22) Filed: Aug. 9, 2011

(65) Prior Publication Data
US 2013/0038443 A1   Feb. 14, 2013

(51) Int. Cl.
*B60C 23/00* (2006.01)
(52) U.S. Cl.
USPC ............. 340/447; 340/442; 73/146; 73/146.2
(58) Field of Classification Search
USPC ............ 340/442–448; 73/146–146.8; 701/36; 152/415
See application file for complete search history.

(56) References Cited

U.S. PATENT DOCUMENTS

| | | | |
|---|---|---|---|
| 2,428,089 A | 9/1947 | Mumma et al. |
| 2,451,859 A | 10/1948 | Mumma et al. |
| 3,777,062 A | 12/1973 | Ogawa |
| 3,814,839 A | 6/1974 | Lubarsky et al. |
| 3,814,840 A | 6/1974 | Lubarsky et al. |
| 4,703,359 A | 10/1987 | Rumbolt |
| 4,734,674 A | 3/1988 | Thomas et al. |
| 4,737,761 A | 4/1988 | Dosjoub et al. |
| 4,742,857 A | 5/1988 | Gandhi |
| 4,774,511 A | 9/1988 | Rumbolt et al. |
| 4,924,210 A | 5/1990 | Matsui et al. |
| 4,959,810 A | 9/1990 | Darbee |
| 4,999,622 A | 3/1991 | Amano et al. |
| 5,061,917 A | 10/1991 | Higgs et al. |
| 5,196,682 A | 3/1993 | Englehardt |
| 5,201,067 A | 4/1993 | Grube |
| 5,223,844 A | 6/1993 | Mansel |
| 5,228,077 A | 7/1993 | Darbee |
| 5,231,872 A | 8/1993 | Bowler et al. |
| 5,243,430 A | 9/1993 | Emmons |
| 5,255,313 A | 10/1993 | Darbee |

(Continued)

FOREIGN PATENT DOCUMENTS

| | | |
|---|---|---|
| DE | 4492128 | 6/1996 |
| DE | 19720123 | 7/1998 |

(Continued)

OTHER PUBLICATIONS

Jeff Burgess, "Tire Pressure Monitoring System Reference Design", Tire Pressure Monitor System Demo, AN1951/D, Rev 1, May 2003, Motorola, Inc., 2003 (24 pgs.).

(Continued)

*Primary Examiner* — Eric M Blount

(57) ABSTRACT

A determination is made as to whether a frame to be transmitted according to a first protocol is susceptible to being incorrectly interpreted by a receiver in a vehicle as being transmitted according to a second protocol. When the frame is determined to be susceptible to an incorrect interpretation, an internal value of the frame is adjusted, and the adjustment is effective to prevent an incorrect interpretation of the frame being transmitted from the tire pressure monitor to the receiver. The adjusted frame can then be transmitted.

21 Claims, 6 Drawing Sheets

U.S. PATENT DOCUMENTS

| | | |
|---|---|---|
| 5,303,259 A | 4/1994 | Loveall |
| 5,335,540 A | 8/1994 | Bowler et al. |
| 5,365,225 A | 11/1994 | Bachhuber |
| 5,414,761 A | 5/1995 | Darbee |
| 5,455,570 A | 10/1995 | Cook |
| 5,515,052 A | 5/1996 | Darbee |
| 5,537,463 A | 7/1996 | Escobosa |
| 5,540,092 A | 7/1996 | Handfield et al. |
| 5,552,917 A | 9/1996 | Darbee |
| 5,562,787 A | 10/1996 | Koch et al. |
| 5,564,101 A | 10/1996 | Eisfeld et al. |
| 5,581,023 A | 12/1996 | Handfield et al. |
| 5,585,554 A | 12/1996 | Handfield et al. |
| 5,600,301 A | 2/1997 | Robinson, III |
| 5,602,524 A | 2/1997 | Mock et al. |
| 5,614,906 A | 3/1997 | Hayes |
| 5,624,265 A | 4/1997 | Redford |
| 5,661,651 A | 8/1997 | Geschke et al. |
| 5,663,496 A | 9/1997 | Handfield et al. |
| 5,698,353 A | 12/1997 | Jeong |
| 5,706,247 A | 1/1998 | Merritt et al. |
| 5,731,516 A | 3/1998 | Handfield et al. |
| 5,731,763 A | 3/1998 | Herweck |
| 5,741,966 A | 4/1998 | Handfield et al. |
| 5,808,558 A | 9/1998 | Meek et al. |
| 5,838,229 A | 11/1998 | Robinson, III |
| 5,841,390 A | 11/1998 | Tsui |
| 5,844,131 A | 12/1998 | Gabelmann et al. |
| 5,880,363 A | 3/1999 | Meyer et al. |
| 5,883,305 A | 3/1999 | Jo et al. |
| 5,900,808 A | 5/1999 | Lebo |
| 5,926,087 A | 7/1999 | Busch et al. |
| 5,959,751 A | 9/1999 | Darbee |
| 5,963,128 A | 10/1999 | McClelland |
| 5,965,808 A | 10/1999 | Normann et al. |
| 6,002,450 A | 12/1999 | Darbee |
| 6,005,486 A | 12/1999 | Fridley |
| 6,011,463 A | 1/2000 | Cormier, Sr. |
| 6,014,092 A | 1/2000 | Darbee |
| 6,018,993 A | 2/2000 | Normann et al. |
| 6,021,319 A | 2/2000 | Tigwell |
| 6,034,597 A | 3/2000 | Normann et al. |
| 6,078,270 A | 6/2000 | Shim |
| 6,087,930 A | 7/2000 | Kulka et al. |
| 6,112,165 A | 8/2000 | Uhl et al. |
| 6,124,786 A | 9/2000 | Normann et al. |
| 6,154,658 A | 11/2000 | Casi |
| 6,155,119 A | 12/2000 | Normann et al. |
| 6,169,480 B1 | 1/2001 | Uhl et al. |
| 6,169,907 B1 | 1/2001 | Chang et al. |
| 6,181,241 B1 | 1/2001 | Normann et al. |
| 6,192,747 B1 | 2/2001 | Fennel |
| 6,194,999 B1 | 2/2001 | Uhl et al. |
| 6,201,819 B1 | 3/2001 | Luders |
| 6,204,758 B1 | 3/2001 | Wacker et al. |
| 6,208,341 B1 | 3/2001 | van Ee et al. |
| 6,218,936 B1 | 4/2001 | Imao |
| 6,259,361 B1 | 7/2001 | Robillard et al. |
| 6,271,748 B1 | 8/2001 | Derbyshire et al. |
| 6,275,148 B1 | 8/2001 | Takamura et al. |
| 6,297,731 B1 | 10/2001 | Flick |
| 6,298,095 B1 | 10/2001 | Kronestedt et al. |
| 6,333,698 B1 | 12/2001 | Roddy |
| 6,362,731 B1 | 3/2002 | Lill |
| 6,369,703 B1 | 4/2002 | Lill |
| 6,396,408 B2 | 5/2002 | Drummond et al. |
| 6,400,263 B1 | 6/2002 | Kokubo |
| 6,408,232 B1 | 6/2002 | Cannon et al. |
| 6,438,467 B1 | 8/2002 | Pacsai |
| 6,441,728 B1 | 8/2002 | Dixit et al. |
| 6,445,286 B1 | 9/2002 | Kessler et al. |
| 6,446,502 B1 | 9/2002 | Normann et al. |
| 6,453,737 B2 | 9/2002 | Young et al. |
| 6,463,798 B2 | 10/2002 | Niekerk et al. |
| 6,469,621 B1 | 10/2002 | Vredevoogd et al. |
| 6,477,165 B1 | 11/2002 | Kosco |
| 6,486,773 B1 | 11/2002 | Bailie et al. |
| 6,489,888 B1 | 12/2002 | Honeck et al. |
| 6,490,452 B1 | 12/2002 | Boscovic et al. |
| 6,507,306 B1 | 1/2003 | Griesau |
| 6,518,891 B2 | 2/2003 | Tsutsui et al. |
| 6,567,032 B1 | 5/2003 | Mullaly |
| 6,571,617 B2 | 6/2003 | Van Niekerk et al. |
| 6,612,165 B2 | 9/2003 | Juzswik et al. |
| 6,622,552 B1 | 9/2003 | Delaporte |
| 6,630,885 B2 | 10/2003 | Hardman et al. |
| 6,633,229 B1 | 10/2003 | Normann et al. |
| 6,662,642 B2 | 12/2003 | Breed et al. |
| 6,667,687 B1 | 12/2003 | DeZori |
| 6,681,164 B2 | 1/2004 | Berghoff et al. |
| 6,705,155 B2 | 3/2004 | Katou |
| 6,710,708 B2 | 3/2004 | McClelland et al. |
| 6,737,965 B2 | 5/2004 | Okubo |
| 6,738,697 B2 | 5/2004 | Breed |
| 6,747,590 B1 | 6/2004 | Weber |
| 6,750,761 B1 | 6/2004 | Newman |
| 6,774,778 B2 | 8/2004 | Lin |
| 6,778,380 B2 | 8/2004 | Murray |
| 6,788,193 B2 | 9/2004 | King et al. |
| 6,794,993 B1 | 9/2004 | Kessler et al. |
| 6,801,872 B2 | 10/2004 | Normann et al. |
| 6,804,999 B2 | 10/2004 | Okubo |
| 6,822,603 B1 | 11/2004 | Crimmins et al. |
| 6,828,905 B2 | 12/2004 | Normann et al. |
| 6,832,573 B2 | 12/2004 | Evans et al. |
| 6,871,157 B2 | 3/2005 | Lefaure |
| 6,879,252 B2 | 4/2005 | DeZorzi et al. |
| 6,885,282 B2 | 4/2005 | Desai |
| 6,885,292 B2 | 4/2005 | Katou |
| 6,885,293 B2 | 4/2005 | Okumura |
| 6,885,296 B2 | 4/2005 | Hardman et al. |
| 6,888,471 B2 | 5/2005 | Elsner et al. |
| 6,897,770 B2 | 5/2005 | Lill |
| 6,904,796 B2 | 6/2005 | Pacsai et al. |
| 6,906,624 B2 | 6/2005 | McClelland et al. |
| 6,910,627 B1 | 6/2005 | Simpson-Young et al. |
| 6,914,523 B2 | 7/2005 | Munch et al. |
| 6,915,146 B1 | 7/2005 | Nguyen et al. |
| 6,915,229 B2 | 7/2005 | Taguchi et al. |
| 6,919,798 B2 | 7/2005 | Ide |
| 6,920,785 B2 | 7/2005 | Toyofuku |
| 6,922,140 B2 | 7/2005 | Hernando et al. |
| 6,927,679 B2 | 8/2005 | Taguchi et al. |
| 6,941,803 B2 | 9/2005 | Hirohama et al. |
| 6,972,671 B2 | 12/2005 | Normann et al. |
| 6,983,649 B2 | 1/2006 | Katou |
| 6,996,418 B2 | 2/2006 | Teo et al. |
| 7,002,455 B2 | 2/2006 | Buck et al. |
| 7,010,968 B2 | 3/2006 | Stewart et al. |
| 7,015,801 B1 | 3/2006 | Juzswik |
| 7,017,403 B2 | 3/2006 | Normann et al. |
| 7,034,661 B2 | 4/2006 | Lonsdale et al. |
| 7,039,397 B2 | 5/2006 | Chuey |
| 7,042,348 B2 | 5/2006 | Schulze et al. |
| 7,050,794 B2 | 5/2006 | Chuey et al. |
| 7,084,749 B1 | 8/2006 | Honeck et al. |
| 7,084,751 B2 | 8/2006 | Klamer |
| 7,088,226 B2 | 8/2006 | McClelland et al. |
| 7,095,316 B2 | 8/2006 | Kachouh et al. |
| 7,096,003 B2 | 8/2006 | Joao et al. |
| 7,103,460 B1 | 9/2006 | Breed |
| 7,104,438 B2 | 9/2006 | Benedict |
| 7,113,083 B2 | 9/2006 | Suitsu |
| 7,116,213 B2 | 10/2006 | Thiesen et al. |
| 7,116,218 B2 | 10/2006 | Ogawa et al. |
| 7,120,430 B2 | 10/2006 | Christenson et al. |
| 7,137,296 B2 | 11/2006 | Shida et al. |
| 7,148,793 B2 | 12/2006 | Lin |
| 7,161,466 B2 | 1/2007 | Chuey |
| 7,161,476 B2 | 1/2007 | Hardman et al. |
| 7,164,117 B2 | 1/2007 | Breed et al. |
| 7,173,520 B2 | 2/2007 | Desai et al. |
| 7,224,269 B2 | 5/2007 | Miller et al. |
| 7,243,535 B2 | 7/2007 | Shimura |
| 7,254,994 B2 | 8/2007 | Schulze et al. |
| 7,307,480 B2 | 12/2007 | Shiu et al. |
| 7,315,240 B2 | 1/2008 | Watabe |

| Patent/Pub No. | Date | Name |
|---|---|---|
| 7,369,491 B1 | 5/2008 | Beshai et al. |
| 7,380,450 B2 | 6/2008 | Durif |
| 7,414,523 B2 * | 8/2008 | Li et al. .................. 340/447 |
| 7,453,350 B2 | 11/2008 | Kachouh et al. |
| 7,508,762 B2 | 3/2009 | Ohtani |
| 7,512,109 B2 | 3/2009 | Trott et al. |
| 7,518,495 B2 | 4/2009 | Tang et al. |
| 7,519,011 B2 | 4/2009 | Petrus et al. |
| 7,535,841 B1 | 5/2009 | Beshai et al. |
| 7,663,502 B2 | 2/2010 | Breed |
| 7,688,192 B2 | 3/2010 | Kenny et al. |
| 7,697,497 B2 | 4/2010 | Grube et al. |
| 7,817,543 B2 | 10/2010 | Beshai et al. |
| 7,884,707 B2 | 2/2011 | Wittliff et al. |
| 7,885,603 B2 * | 2/2011 | Santavicca .................. 455/41.2 |
| 7,895,886 B2 | 3/2011 | Tozawa et al. |
| 7,948,364 B2 | 5/2011 | Lin et al. |
| 8,013,725 B2 | 9/2011 | Murata et al. |
| 8,019,323 B2 | 9/2011 | Jheng et al. |
| 8,027,359 B2 | 9/2011 | Iwamura |
| 8,031,598 B2 | 10/2011 | Beshai et al. |
| 8,035,257 B2 | 10/2011 | Fornage |
| 8,049,533 B1 | 11/2011 | Lin |
| 8,082,579 B2 | 12/2011 | Shimizu et al. |
| 8,155,617 B2 | 4/2012 | Magnusson et al. |
| 8,185,093 B2 | 5/2012 | Jheng et al. |
| 8,319,378 B2 | 11/2012 | Fornage |
| 8,330,594 B2 | 12/2012 | Suzuki et al. |
| 8,332,104 B2 * | 12/2012 | Greer et al. .................. 701/49 |
| 2001/0050611 A1 | 12/2001 | Achterholt |
| 2002/0030592 A1 | 3/2002 | Laitsaari et al. |
| 2002/0059825 A1 | 5/2002 | Lundqvist |
| 2002/0067285 A1 | 6/2002 | Lill |
| 2002/0075145 A1 | 6/2002 | Hardman et al. |
| 2002/0084895 A1 | 7/2002 | Dixit et al. |
| 2002/0086708 A1 | 7/2002 | Teo et al. |
| 2002/0121132 A1 | 9/2002 | Breed et al. |
| 2002/0126005 A1 | 9/2002 | Hardman et al. |
| 2002/0130803 A1 | 9/2002 | Conway et al. |
| 2002/0144134 A1 | 10/2002 | Watanabe et al. |
| 2002/0168795 A1 | 11/2002 | Schuurmans |
| 2002/0186320 A1 | 12/2002 | Carlsgaard |
| 2002/0190852 A1 | 12/2002 | Lin |
| 2003/0005759 A1 | 1/2003 | Breed et al. |
| 2003/0009270 A1 | 1/2003 | Breed |
| 2003/0050070 A1 | 3/2003 | Mashinsky et al. |
| 2003/0079537 A1 | 5/2003 | Luce |
| 2003/0080860 A1 | 5/2003 | Stewart et al. |
| 2003/0080861 A1 | 5/2003 | Okubo |
| 2003/0095553 A1 | 5/2003 | Shiomoto et al. |
| 2003/0110851 A1 | 6/2003 | Tsujita |
| 2003/0112138 A1 | 6/2003 | Marguet et al. |
| 2003/0117276 A1 | 6/2003 | Marguet et al. |
| 2003/0117277 A1 | 6/2003 | Marguet et al. |
| 2003/0131297 A1 | 7/2003 | Fischel et al. |
| 2003/0179082 A1 | 9/2003 | Ide |
| 2003/0197594 A1 | 10/2003 | Olson et al. |
| 2003/0197595 A1 | 10/2003 | Olson et al. |
| 2003/0197603 A1 | 10/2003 | Stewart et al. |
| 2003/0228879 A1 | 12/2003 | Witkowski |
| 2004/0039509 A1 | 2/2004 | Breed |
| 2004/0041698 A1 | 3/2004 | Lin |
| 2004/0061601 A1 | 4/2004 | Freakes |
| 2004/0113765 A1 | 6/2004 | Suitsu |
| 2004/0130442 A1 | 7/2004 | Breed et al. |
| 2004/0149025 A1 | 8/2004 | Toyofuku |
| 2004/0172179 A1 | 9/2004 | Miwa |
| 2004/0174246 A1 | 9/2004 | Mitchell |
| 2004/0203370 A1 | 10/2004 | Luo et al. |
| 2004/0215382 A1 | 10/2004 | Breed et al. |
| 2005/0039103 A1 | 2/2005 | Azenko et al. |
| 2005/0046584 A1 | 3/2005 | Breed |
| 2005/0075145 A1 | 4/2005 | Dvorak et al. |
| 2005/0104722 A1 | 5/2005 | Tang et al. |
| 2005/0134446 A1 | 6/2005 | Stewart et al. |
| 2005/0156722 A1 | 7/2005 | McCall et al. |
| 2005/0179530 A1 | 8/2005 | Stewart et al. |
| 2005/0192727 A1 | 9/2005 | Shostak et al. |
| 2005/0264405 A1 | 12/2005 | Ueda |
| 2006/0001535 A1 | 1/2006 | Hafele et al. |
| 2006/0006992 A1 | 1/2006 | Daiss et al. |
| 2006/0012475 A1 | 1/2006 | Froitzheim et al. |
| 2006/0017554 A1 | 1/2006 | Stewart et al. |
| 2006/0022813 A1 | 2/2006 | Schulze et al. |
| 2006/0025897 A1 | 2/2006 | Shostak et al. |
| 2006/0044125 A1 | 3/2006 | Pierbon |
| 2006/0114107 A1 | 6/2006 | Kim et al. |
| 2006/0145829 A1 | 7/2006 | Watabe |
| 2006/0148456 A1 | 7/2006 | Chuey |
| 2006/0161327 A1 | 7/2006 | Emmerich et al. |
| 2006/0187014 A1 * | 8/2006 | Li et al. .................. 340/447 |
| 2006/0192661 A1 | 8/2006 | Gerardiere |
| 2006/0201241 A1 | 9/2006 | Durif |
| 2006/0217850 A1 | 9/2006 | Geerlings et al. |
| 2006/0235641 A1 | 10/2006 | Fink et al. |
| 2006/0273889 A1 | 12/2006 | Schulze et al. |
| 2007/0063814 A1 | 3/2007 | Olson et al. |
| 2007/0069947 A1 | 3/2007 | Banet et al. |
| 2007/0176736 A1 | 8/2007 | Chuey et al. |
| 2007/0182531 A1 | 8/2007 | Kuchler |
| 2007/0190993 A1 | 8/2007 | Chuey et al. |
| 2007/0194898 A1 | 8/2007 | Fukumori |
| 2007/0210920 A1 | 9/2007 | Panotopoulos |
| 2007/0223484 A1 | 9/2007 | Crowle et al. |
| 2007/0247294 A1 | 10/2007 | Baader et al. |
| 2007/0279201 A1 | 12/2007 | Casey et al. |
| 2008/0024287 A1 | 1/2008 | Boyle et al. |
| 2008/0037458 A1 | 2/2008 | Myszne |
| 2008/0062880 A1 | 3/2008 | Yew et al. |
| 2008/0080447 A1 | 4/2008 | Grube et al. |
| 2008/0094198 A1 | 4/2008 | Yu |
| 2008/0100430 A1 | 5/2008 | Kochie et al. |
| 2008/0143593 A1 | 6/2008 | Graziano et al. |
| 2008/0165688 A1 | 7/2008 | Beshai et al. |
| 2008/0173082 A1 | 7/2008 | Hettle et al. |
| 2008/0177441 A1 | 7/2008 | Marlett et al. |
| 2008/0205553 A1 | 8/2008 | Costello et al. |
| 2008/0211672 A1 | 9/2008 | Pei |
| 2008/0240283 A1 | 10/2008 | Iwamura |
| 2008/0256260 A1 | 10/2008 | Magnusson et al. |
| 2008/0285507 A1 | 11/2008 | Mukherjee et al. |
| 2008/0320243 A1 | 12/2008 | Mitsuzuka et al. |
| 2009/0033478 A1 | 2/2009 | Deniau et al. |
| 2009/0045930 A1 | 2/2009 | Fu |
| 2009/0067854 A1 | 3/2009 | Yokogawa et al. |
| 2009/0070863 A1 | 3/2009 | Shimizu et al. |
| 2009/0108992 A1 | 4/2009 | Shafer |
| 2009/0179747 A1 | 7/2009 | Lin et al. |
| 2009/0184815 A1 | 7/2009 | Suzuki et al. |
| 2009/0207859 A1 | 8/2009 | Beshai et al. |
| 2009/0231114 A1 | 9/2009 | Yu |
| 2009/0267751 A1 | 10/2009 | Kaleal |
| 2009/0291710 A1 | 11/2009 | Jheng et al. |
| 2009/0310477 A1 | 12/2009 | Lee et al. |
| 2010/0308987 A1 * | 12/2010 | Haas et al. .................. 340/447 |
| 2011/0140676 A1 | 6/2011 | Deniau |
| 2011/0181321 A1 | 7/2011 | Matsudera |
| 2011/0211414 A1 | 9/2011 | Musha |
| 2011/0250860 A1 | 10/2011 | Lin |
| 2011/0267024 A1 | 11/2011 | Halberstadt |
| 2011/0294548 A1 | 12/2011 | Jheng et al. |
| 2012/0117788 A1 | 5/2012 | Deniau |
| 2012/0119895 A1 | 5/2012 | Deniau |
| 2012/0147184 A1 | 6/2012 | Siann et al. |
| 2012/0185110 A1 | 7/2012 | Deniau et al. |
| 2012/0274461 A1 * | 11/2012 | Colombo et al. .............. 340/447 |

FOREIGN PATENT DOCUMENTS

| | | |
|---|---|---|
| DE | 19924830 | 11/2000 |
| DE | 10014076 | 10/2001 |
| DE | 10040238 | 3/2002 |
| DE | 10247761 | 6/2003 |
| DE | 10217239 | 7/2003 |
| DE | 10207014 | 8/2003 |
| DE | 10307265 | 10/2003 |
| DE | 69529456 | 11/2003 |
| DE | 10247149 | 4/2004 |
| DE | 60108973 | 7/2005 |

| | | |
|---|---|---|
| DE | 60202342 | 12/2005 |
| DE | 60023387 | 7/2006 |
| DE | 102005004825 | 8/2006 |
| DE | 102005059009 | 6/2007 |
| DE | 102007039599 | 3/2008 |
| DE | 102008008237 | 8/2009 |
| EP | 793579 | 9/1997 |
| EP | 1026016 | 8/2000 |
| EP | 1291230 | 3/2003 |
| EP | 1428694 | 6/2004 |
| EP | 1547827 | 6/2005 |
| EP | 1562162 | 8/2005 |
| EP | 1026015 | 5/2006 |
| EP | 1352763 | 4/2008 |
| EP | 1340629 | 6/2008 |
| GB | 2387032 | 10/2003 |
| GB | 2420415 | 5/2006 |
| JP | 62003537 | 1/1987 |
| JP | 63090407 | 4/1988 |
| JP | 05107134 | 4/1993 |
| JP | 8244423 | 9/1996 |
| JP | 2000142044 | 5/2000 |
| JP | 2000238515 | 9/2000 |
| JP | 2001080321 | 3/2001 |
| JP | 2003025817 | 1/2003 |
| JP | 2004-145474 | 5/2004 |
| JP | 2006015832 | 1/2006 |
| JP | 2007200081 | 8/2007 |
| KR | 2003068216 | 8/2003 |
| RU | 2238190 | 10/2004 |
| WO | 94/20317 | 9/1994 |
| WO | 9422693 | 10/1994 |
| WO | 99/08887 | 2/1999 |
| WO | 0072463 | 11/2000 |
| WO | 0145967 | 6/2001 |
| WO | 02/094588 | 11/2002 |
| WO | 03016079 | 2/2003 |
| WO | 2004038674 | 5/2004 |
| WO | 2005085651 | 9/2005 |
| WO | 2005116603 | 12/2005 |
| WO | 20091006518 | 1/2008 |
| WO | 2008/103973 | 8/2008 |
| WO | 2008-106387 A1 | 9/2008 |
| WO | 2008107430 | 9/2008 |

OTHER PUBLICATIONS

"Motorola's MPXY8000 Series Tire Pressure Monitoring Sensors", Motorola Sensor Products Division Transportation & Standard Products Group, Motorola, Inc., May 2003 (22 pgs.).

Alfred Pohl et al. "Wirelessly Interrogable Surface Acoustic Wave Sensors for Vehicular Applications", IEEE Transactions On Instrumentation And Measurement vol. 46, No. 4, IEEE, Aug. 1997 (8 pgs..).

"Tire pressure Warning System Using Direct Measurement Method (SOARER)" G0880A ISSN: 0388-3841, vol. 51 No. 7, pp. 174-179, Toyota Motor Corporation, May 2, 2002 (6 pgs.).

International Search Report and Written Opinion dated Sep. 28, 2012, from corresponding International Patent Application No. PCT/US2011/047112.

"Sony Remote Commander Operating Instructions RM-V70/N801", 1998, Sony Corporation.

"Philips Magnavox 4 Function with Back Lighted Keypad Universal Remote" Operating Instructions, printed Oct. 2012, Philips Electronics North America Corporation.

"RadioShack 8-In-One Touch Screen Remote Control", Owner's Manual, 2001, RadioShack Corporation.

Kais Mnif, "A Smart Tire Pressure Monitoring System", Sensors Magazine, Nov. 1, 2001.

International Search Report and Written Opinion dated Sep. 28, 2012, from corresponding International Patent Application No. PCT/US20111047108.

International Search Report dated Apr. 6, 2012, from corresponding International Patent Application No. PCT/ US2011/047087.

International Search Report and Written Opinion mailed on Oct. 15, 2008, for Application No. PCT/US2008/069006.

International Preliminary Report on Patentability mailed on Jan. 14, 2010, for Application No. PCT/US2008/069006.

Chinese Office Action mailed on Apr. 19, 2011, for Chinese Application 200880023390.7 (Corresponding to PCT/ US2008/069006).

Chinese Office Action (first) mailed on Feb. 16, 2012, for Chinese Application 200880023390.7 (Corresponding to PCT/US2008/069006).

Chinese Office Action (third) mailed on Oct. 10, 2012, for Chinese Application 200880023390.7 (Corresponding to PCT/US2008/069006).

Japanese Office Action mailed on Jun. 7, 2012, for JP Application 2010-515252 (Corresponding to PCT/US2008/069006).

International Search Report and Written Opinion dated Sep. 28, 2012, from corresponding International Patent Application No. PCT/US20111047104.

Germany Office Action dated Nov. 19, 2012.

Germany Office Action dated Sep. 17, 2007.

Preliminary Invalidity Contentions of Defendant Continental Automotive Systems US, Inc.; dated Jan. 17, 2012, in the United States District Court for Western District of Virginia Lynchburg Division, Civil Action No. 6:11-CV-00014-NKM.

Amended Invalidity Contentions of Defendant Continental Automotive Systems US, Inc.; dated Jun. 18, 2012, in the United States District Court for Eastern District of Michigan Southern Division, Civil Action No. 2:12-cv-10715-SJM-MJH.

Plaintiffs' Initial Infringement Contentions; dated Dec. 15, 2011, in the United States District Court for Western District of Virginia Lynchburg Division, Civil Action No. 6:11-CV-00014-NKM-RSB.

Joint Claim Construction and Prehearing Statement, dated Jun. 11, 2012, from co-pending litigation: *Schrader-Bridgeport Intl, Inc.* v. *Continental Automotive Sys, US, Inc.*, case docket No. 2:12-cv-10715-SJM-MJH, (filed Feb. 16, 2012, E.D. Mich.).

Plaintiffs' Opening Claim Construction Brief, dated Jun. 26, 2012, from co-pending litigation: *Schrader-Bridgeport Int'l, Inc.* v. *Continental Automotive Sys. US, Inc.*, case docket No. 2:12-cv-10715-SJM-MJH, (filed Feb. 16, 2012, E.D. Mich.).

USPTO Translation copy of JP2003025817A, translated from Japanese by Schreiber Translations, Inc., Feb, 2013.

Jeff Burgess "TPMS Demonstration Kit", AN1943/D, Rev 1, Apr. 2002, Motorola, Inc., 2002 (16 pgs.).

* cited by examiner

PROTOCOL MISINTERPRETATION AVOIDANCE APPARATUS AND METHOD FOR A TIRE PRESSURE MONITORING SYSTEM

CROSS REFERENCES TO RELATED APPLICATIONS

"Tire Pressure Monitoring Apparatus and Method" having Ser. No. 13/206,255;

"Protocol Arrangement in a Tire Pressure Monitoring System" having Ser. No. 13/206,314; and "Apparatus and Method for Activating a Localization Process for a Tire Pressure Monitor" having Ser. No. 13/206,336 all of which being filed on the same date as the present application and all of which having their contents incorporated herein by reference in their entireties.

FIELD OF THE INVENTION

The field of the invention relates to tire pressure monitoring devices that utilize potentially different transmission protocols.

BACKGROUND

The pressure and other operating parameters of tires are important concerns when operating a vehicle. Not only can incorrect tire pressure (or the incorrect setting of some other tire parameter) lead to inefficient vehicle operation (e.g., the waste of fuel and other problems leading to higher operating costs), but too low a tire pressure (or an inadequate value for some other tire parameter) can lead to safety problems such as accidents. It is difficult and sometimes time-consuming for users to manually measure tire pressure (or other parameters) with a pressure gauge (or other instruments). Consequently, automatic tire pressure monitoring systems have been devised and these systems free the user from manually making tire measurements.

An automatic tire pressure monitoring device typically mounts to a wheel within the tire and wirelessly transmits information indicative of conditions within the tire. The transmissions and the order of information are typically defined by a protocol corresponding to a receiver within the vehicle. Once the receiver receives the information, the information can be processed and presented to a user. For instance, a user can be warned when the pressure in their tires is too high or too low and thus avoid safety problems. Each automobile manufacturer typically has a unique, preferred, and pre-defined protocol to meet application specific needs and applications. Consequently, receivers using one manufacturers' protocol are generally not responsive to transmitters operating according to other manufacturers' protocols.

Figure 1:
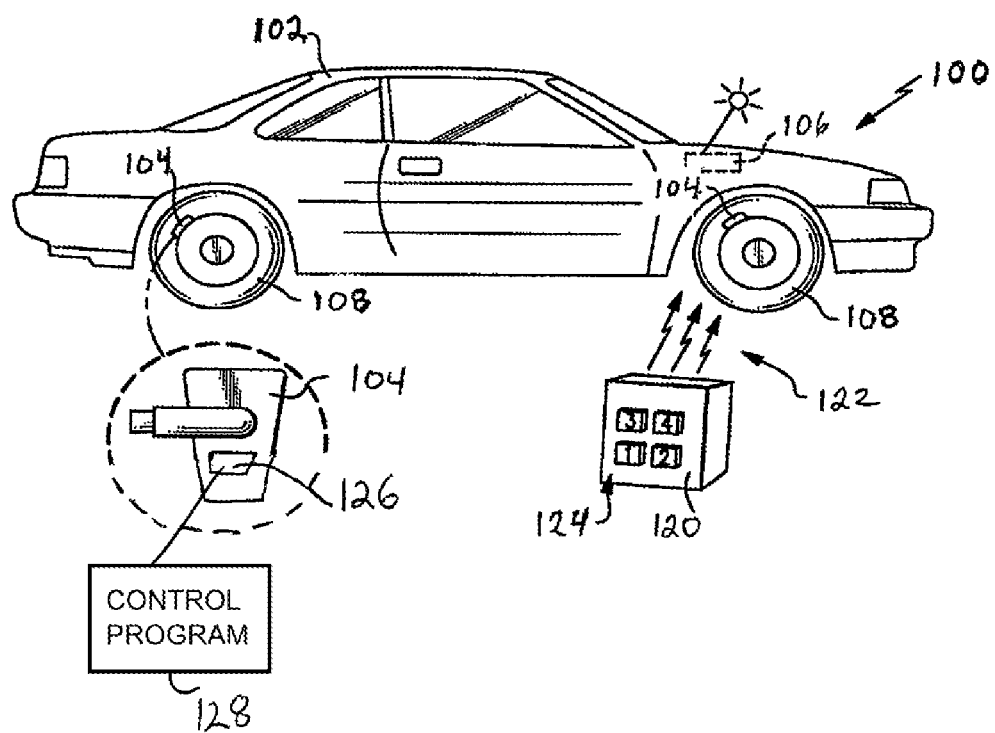
FIG. 1 comprises a block diagram of a tire pressure monitoring system according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where a tire pressure monitor makes dynamic adjustments to transmitted frames on a frame-by-frame basis (as each frame is transmitted) so that misinterpretation of these frames at receivers is avoided or prevented. The approaches are implemented at the tire pressure monitor and are transparent to end-users. Since end-user involvement is eliminated, the approaches are easy to use and increase the reliability and performance of the tire pressure monitoring system.

In many of these embodiments, a determination is made as to whether a frame to be transmitted according to a first protocol is susceptible to being incorrectly interpreted by a receiver in a vehicle as being transmitted according to a second protocol. When the frame is determined to be susceptible to an incorrect interpretation, an internal value of the frame is adjusted, and the adjustment is effective to prevent an incorrect interpretation of the frame being transmitted from the tire pressure monitor to the receiver. The adjusted frame can then be transmitted from the tire pressure monitor. The internal adjustment act is selected so as to have the least impact on the meaning of the data transmitted.

In some aspects, the adjusting flips at least one bit in the frame. In other aspects, the determining calculates a checksum in the frame according to the checksum determination approach used by the second protocol. Still further, the checksum may be compared to a field in the frame that would be the checksum field according to the second protocol. When the calculated checksum equals the value of the field, a possible misinterpretation may occur. When the possible misinterpretation may occur, at least one bit is flipped in the frame.

In others of these embodiments, an apparatus for avoiding protocol misinterpretation in a tire pressure monitoring system includes a transmission buffer, a transmitter, and a controller. The transmission buffer is configured to store a frame to be transmitted according to a first protocol. The transmitter is coupled to the transmission buffer. The controller is coupled to the transmission buffer and the transmitter and is configured to determine whether the frame to be transmitted according to the first protocol is susceptible to being incorrectly interpreted by a receiver as being transmitted according to a second protocol. When the frame is determined to be susceptible to an incorrect interpretation, an adjustment is made to an internal value of the frame and the adjustment is effective to prevent an incorrect interpretation of the frame. The controller is further configured to effect transmission of the frame from the transmission buffer via the transmitter.

Referring to FIG. 1, a tire pressure monitoring system 100 is shown assembled within a vehicle 102. The system 100 includes a receiver 106 that receives communications from tire pressure monitoring devices 104 ("monitors") assembled within each of the vehicle's tires 108. The receiver 106 may be any communication device configured to receive any type of transmitted communication but tuned to only recognize some of these communications. In one example, these communications are radio frequency (RF) communications, but other types of communications are also possible.

Although the device 104 is described as a tire pressure monitoring device herein, it will be appreciated that this device can gather and transmit other types of information related to the tire in addition to or in place of tire pressure information. For example, the information can include temperature information or information related to the wear of the treads of the tire. Appropriate sensors or sensing devices may be used to obtain this information. Other examples of information may also be gathered by the tire pressure monitoring device 104.

Each of the tire pressure monitoring devices 104 are assembled within the tires 108 of the vehicle 102 and, as mentioned, communicate information indicative of conditions within the tires 108 to the receiver 106. These conditions include temperature, pressure, and/or any other desired information that aids in the evaluation of tire conditions. Other examples of conditions may also be sensed.

The system 100 includes the tire pressure monitoring devices 104 that in this example includes a memory device 126. The memory device 126 is utilized for the storage of a control program 128. The control program 128, once compiled and executed, transmits sensed information (e.g., tire pressure information) according to one or more protocols (or formats) that govern operation and communication between the tire pressure monitoring device 104 and the receiver 106. Examples of communication protocols that may be used include protocols that specify the frequency and timing of transmissions from the tire pressure monitoring device 104 to the receiver 106 or the format of transmission (such as what constitutes a "1" or a "0," modulation type, error detection and/or correction content, synchronization pattern, and so forth to not but a few examples in these regards). Tire pressure monitoring information may be transmitted according to the protocols sequentially (e.g., using the same antenna) or at the same time (e.g., using different antennas). In some aspects, no separate manufacturers' codes are used in making the transmissions. Once the control program is compiled, the protocols that have been selected cannot be changed without changing (e.g., editing, compiling and installing anew) the control program 128. In one aspect, the control program 128 is compiled and stored in the memory 126 during manufacturing.

In one aspect, the control program 128 may be executed continuously whenever the vehicle is moving. The control program 128 may also be executed when the vehicle is not moving, but only when the sensor is activated externally (i.e., via LF or grounding of a pin on the ASIC during manufacturing). At other times, it may not be executed. However, learning the identities of the devices 104 (a "learning" process) and/or determining where each device is located (a "localization" process, e.g., front left, front right, and so forth) may be accomplished by using an activation device 120. The activation device 120 emits a wireless signal 122 (e.g., an LF signal) that is received by a corresponding one of the tire pressure monitoring devices 104. Receipt of the wireless signal 122 causes the device 104 to transmit identity information and also indicate to the receiver 106 that the device 104 has received an LF signal and that the localization process can occur. When the vehicle is moving, LF transmitters (e.g., antennas) may transmit LF signals (in place of the device 120). When moving, the RF signals are periodically being transmitted and when the device 104 finds an LF signal, it so indicates to the receiver 106 (e.g., by flipping a bit in the RF transmission). Once this indication is received, localization can be completed (e.g., this process may occur for a predetermined amount of time to ensure that the device 104 is correctly localized). Once localization is complete, tire pressure information can be associated with a known tire. It will be appreciated that in other examples, the control program may itself be activated by the LF signals.

The activation device 120 includes a series of selectable buttons 124 (or other types of actuators) that are actuated by a user to indicate that they wish to activate the tire pressure monitoring device. Although the example device 120 is shown with buttons, other display and selection configurations, such as touch screens, switches or some other selection interface may be used as will be appreciated by those skilled in the art. Accordingly, installation of the multi applications tire pressure monitoring devices 104 optionally includes the initial step of physically activating the tire pressure monitoring devices 104 within each of the corresponding tires 108 or activate a localization process that allows tire pressure data to be associated with particular tires.

If an activation device is used, the activation device 120 is placed proximate to each of the tire pressure monitoring devices 104 to send a signal 122. In one example, the signal 122 is a low frequency transmission received by the proximate tire pressure monitoring device 104.

The devices 104 operate with the receiver 106 in the vehicle and the receiver 106 typically has a display (or some sort of user interface) that is configured to alert the driver when the tire pressure falls below a predetermined threshold value. As mentioned, once physically installed in the tire, the devices 104 are first "learned" by the control unit. During this process, the receiver 106 determines the particular identifiers and during or after learning, a localization process may be executed in which each of the devices 104 is associated with a particular tire.

During normal operation (after the sensors are learned and localized and the vehicle is moving), the device 104 senses the tire pressure and sends a radio frequency (RF) signal to the receiver 106 indicating the tire pressure. The receiver 106 can then determine if a pressure problem exists. If a problem exists, the user can be alerted so that appropriate action can be taken. As mentioned, this is all accomplished by use of a control program that is compiled, translated, and/or assembled before it is executed. In one aspect, once compiled the structure of the control program (e.g., the protocols selected) can not be changed. Also, nothing external to the device can be input into this control program to change the structure of the control program once the control program (and the protocols specified in the control program) is compiled. It will be appreciated that although many of the examples described herein refer to a control program being executed to transmit RF frames with tire pressure information, that other approaches can also be used. For instance, systems that utilize manufacturers' codes can also have their monitors localized according to the approaches described herein.

As mentioned, the devices 104 transmit tire pressure information. The signals that are transmitted include bursts that themselves include plurality of frames and each of the frames includes the tire pressure monitoring information. A plurality of pause spaces may be disposed between at least some of the frames in the burst. Characteristics of the frames in the burst or of the burst itself may be selected based upon criteria such as government standards, industry requirements, periodicity requirements, or power requirements. Other examples of criteria are possible.

The characteristics of the signal may include the total number of frames in the burst, the relative positioning of the frames within the burst, the number of frames in the burst from each of plurality of manufacturers, and the relative positioning of the frames within the burst wherein at least some of the frames are from different manufacturers. Other examples of characteristics are possible.

The devices 104 are configured to make a determination is made as to whether a frame to be transmitted according to a first protocol is susceptible to being incorrectly interpreted by a receiver as being transmitted according to a second protocol. When the frame is determined to be susceptible to an incorrect interpretation, the device 104 adjusts an internal value of the frame, and the adjustment is effective to prevent an incorrect interpretation of the frame being transmitted from the device 104 to a receiver in a vehicle. The adjusted frame can then be transmitted from the device 104.

In some aspects, the adjusting flips at least one bit in the frame. In other aspects, the device 104 calculates a checksum in the frame according to the checksum determination made by the second protocol. Still further, the checksum may be compared to a field in the frame that would be the checksum field according to the second protocol. When the checksum equals the value of the field, a possible misinterpretation may occur. When the possible misinterpretation may occur, at least one bit is flipped in the frame by the device 104.

The devices 104 can also receive indications as to whether the vehicle is moving. For example, a signal can be sent from the control unit of the vehicle with this information.

Figure 2:
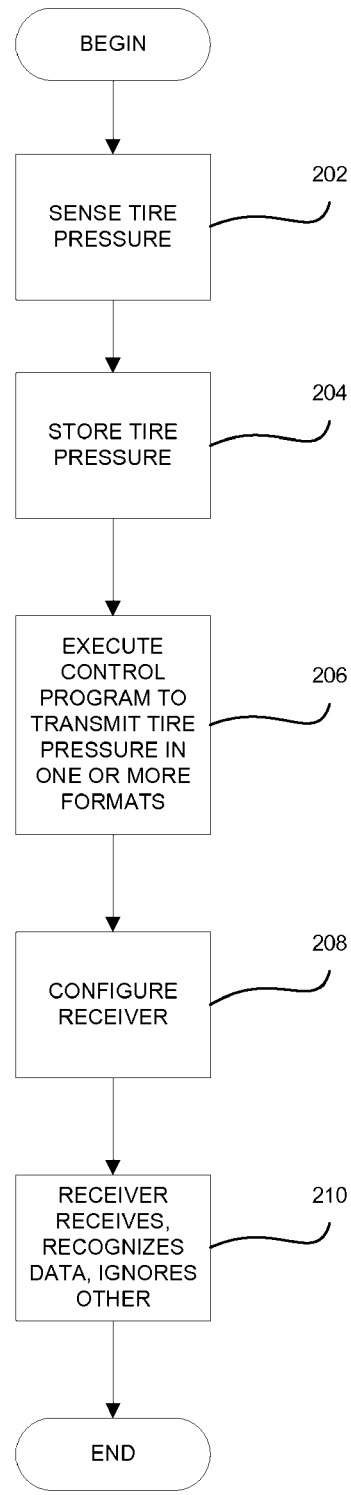
FIG. 2 comprises a flowchart showing one example of an approach for monitoring pressure and/or other parameters of a tire according to various embodiments of the present invention.

Referring now to FIG. 2, one example of an approach for transmitting sensed tire pressure information is described. At step 202, the tire pressure information is sensed. This can be accomplished by any tire pressure sensing mechanism as known to those skilled in the art.

At step 204, the sensed tire pressure information is stored in a transmission buffer. The transmission buffer may be part of a memory.

At step 206, a control program is executed to transmit the tire pressure information from the transmission buffer to an external receiver device according to each of a plurality of communications formats incorporated into the control program and not according to a manufacturers' code. The control program may be stored in the same memory as the transmission buffer or may be stored in a separate memory unit.

The control program may be compiled and/or assembled prior to its execution. The transmission of information according to each of the protocols may be in predetermined block having a pre-defined format. Thus, separate blocks are used to transmit tire pressure information for different protocols. Each of the blocks may be transmitted sequentially in a burst. A null space may be used to separate each of the blocks in the burst.

The control program may also determine as to whether a frame to be transmitted according to a first protocol is susceptible to being incorrectly interpreted by a receiver in a vehicle as being transmitted according to a second protocol. When the frame is determined to be susceptible to an incorrect interpretation, an internal value of the frame is adjusted, and the adjustment is effective to prevent an incorrect interpretation of the frame being transmitted from the transmission buffer of the tire pressure monitor to the receiver.

As mentioned, the transmission buffer is configured to store tire pressure monitoring data and the transmitter is configured to transmit a signal including the tire pressure monitoring data. The signal includes a burst that includes plurality of frames and each of the frames includes the tire pressure monitoring information. A plurality of pause spaces in some examples are disposed between at least some of the frames in the burst. Characteristics of the frames in the burst may be selected based upon criteria such as government standards, industry requirements, periodicity requirements, power requirements, or system requirements. Other examples of criteria are possible.

The characteristics of the signal (e.g., that are adjusted to meet government standards, industry requirements, periodicity requirements, and/or power requirements) may include the total number of frames in the burst, the relative positioning of the frames within the burst, the number of frames in the burst from each of plurality of manufacturers, and the relative positioning of the frames within the burst wherein at least some of the frames are from different manufacturers. Other examples are possible.

At step 208, the external receiver device may be configured to operate according to a selected one of the plurality of communication protocols. At the external receiver device (that is configured to operate according to a selected one of the plurality of communication protocols) receives the tire pressure information transmitted. At step 210, the receiver recognizes the tire pressure information transmitted according to the selected one of the plurality of communication protocols and ignores the tire pressure information transmitted according to others of the plurality of communication protocols. Since the frame has been adjusted, misinterpretation problems are prevented from occurring.

Figure 3:
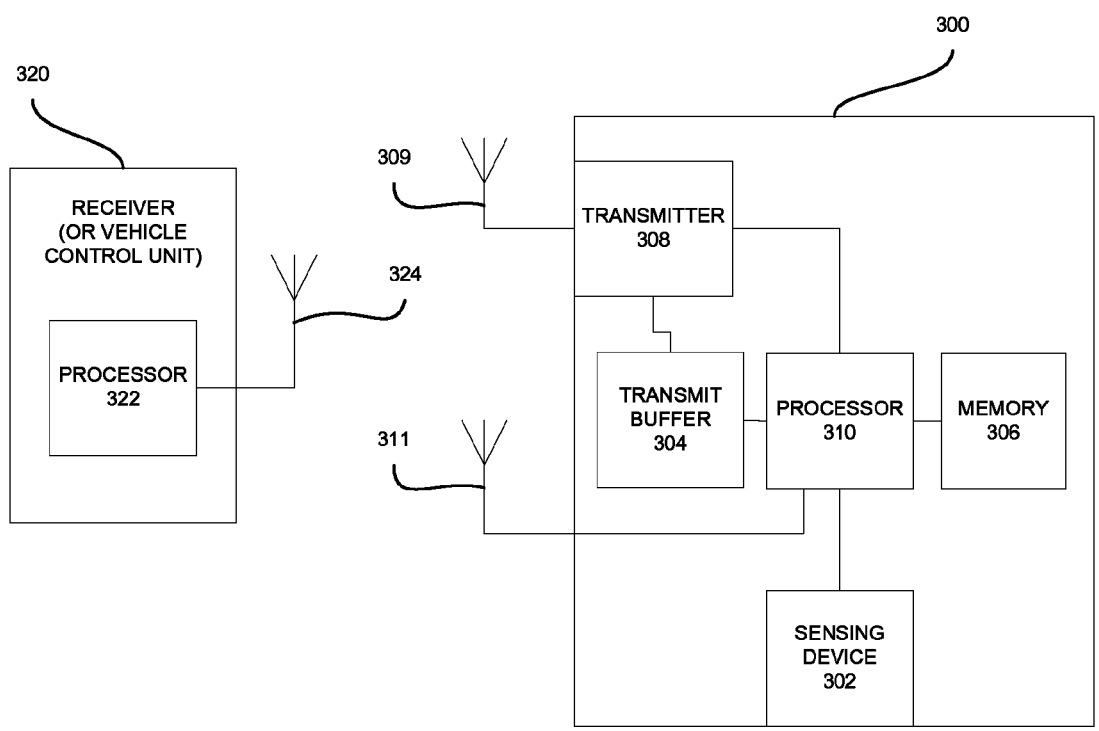
FIG. 3 comprises a block diagram of another example of a tire pressure monitoring apparatus according to various embodiments of the present invention.

Referring now to FIG. 3, an apparatus 300 for sensing tire pressure information is described. The apparatus 300 includes a sensing device 302, a transmission buffer 304, a memory 306, a transmitter 308, and a processor (or controller) 310. One or more antennas 309 transmit RF signals with the tire pressure information (e.g., in blocks, the blocks serially transmitted in bursts, each block having a predetermined format). One or more antennas 311 receive other communications (e.g., LF communications) that activate the apparatus 300 to transmit the RF signals.

The sensor 302 that is configured to sense tire pressure information of a tire. The sensor 302 is any mechanical sensing arrangement that senses the pressure of the tire as know to those skilled in the art.

The transmission buffer 304 is communicatively coupled to the sensing device and is configured to store the sensed tire pressure information. The transmission buffer 304 may be part of the memory 306 or separate from the memory 306 and is configured to store tire pressure monitoring data. The transmission buffer is configured to store a frame to be transmitted according to a first protocol. The memory 306 may be any type of memory storage device.

The transmitter 308 is coupled to the transmission buffer 304 and is configured to transmit signals. The transmitter 308 may have one or more antennas 309 to transmit the signals. As mentioned, one or more antennas 311 receive other communications (e.g., LF communications) that activate the apparatus 300 to transmit the RF signals. These antennas may be coupled to the processor 310, which determines whether the signals meet criteria that are required to activate the apparatus 300 and thereby begin transmitting the tire pressure information. The signal includes a burst that includes plurality of frames and each of the frames includes the tire pressure monitoring information. A plurality of pause spaces is disposed between at least some of the frames in the burst. Characteristics of the frames in the burst may be selected based upon one or more of: government standards, industry requirements, periodicity requirements, or power requirements. Other examples are possible.

The characteristics of the signal relate to at least one characteristic such as the total number of frames in the burst, the relative positioning of the frames within the burst, the number of frames in the burst from each of plurality of manufacturers, and the relative positioning of the frames within the burst wherein at least some of the frames are from different manufacturers. Other examples are possible.

The processor 310 is communicatively coupled to the sensor 302, the transmitter 308, the transmission buffer 304, and the memory 306. The processor 310 is configured to execute a control program stored in a memory and execution of the control program is effective to transmit the tire pressure information from the transmission buffer 304 to an external receiver via the transmitter 308 according to each of a plurality of communications formats incorporated into the control program and not according to a manufacturers' code.

The processor 310 is also configured to determine whether the frame to be transmitted according to the first protocol is susceptible to being incorrectly interpreted by a receiver as being transmitted according to a second protocol. When the frame is determined to be susceptible to an incorrect interpretation, an adjustment is made to an internal value of the frame and the adjustment is effective to prevent an incorrect interpretation of the frame. The processor 310 is further configured to effect transmission of the frame from the transmission buffer via the transmitter.

In other aspects, a receiver 320 is configured to receive the tire pressure information transmitted according to each of the plurality of communication protocols that is transmitted by the transmitter 308 at antenna 324 and communicate the information to processor 322 where the information can be processed. The receiver 320 is further configured to recognize the tire pressure information transmitted according to a selected one of the plurality of communication protocols and ignore the tire pressure information transmitted according to non-selected ones of the plurality of communication protocols.

Figure 4:
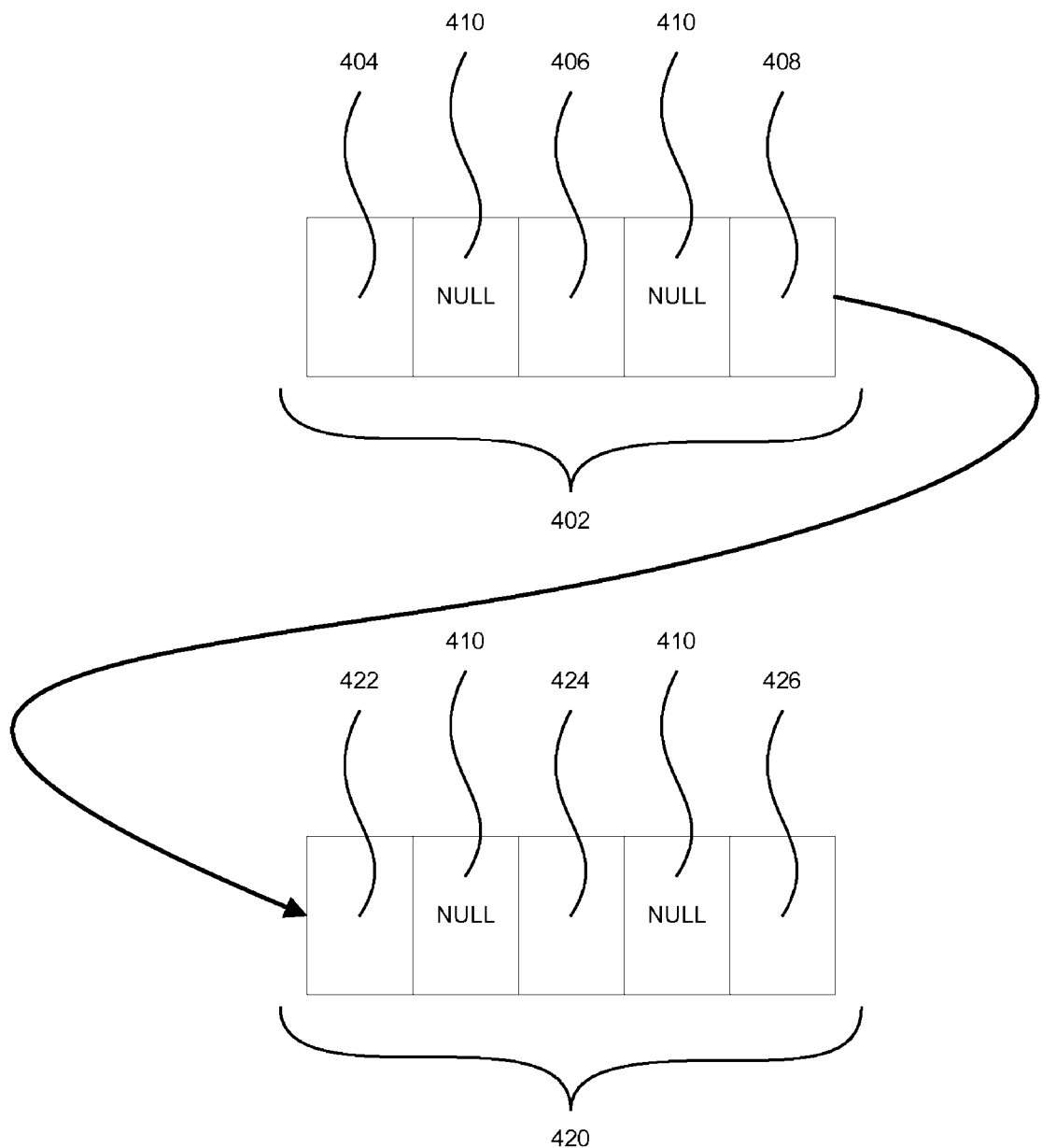
FIG. 4 comprises a block diagram of transmission burst formats according to various embodiments of the present invention.

Referring now to FIG. 4, one example of RF transmissions is described. In this example, a first burst 402 includes blocks (or frames) 404, 406, and 408. A second burst 420 includes frames 422, 424, and 426. Null frames 410 are inserted between the frames, 406, 408, 410, 422, 424, and 426.

Each of the blocks or frames 404, 406, 408, 422, 424, and 426 includes tire pressure information. This information may be in the same or different formats. In one example, all frames 404, 406, 408, 422, 424, and 426 include the information according to the protocol of a first manufacturer. In another example, frame 404 is in the protocol of a first manufacturer, frame 406 is according to the protocol of a second manufacturer, frame 408 is in the protocol of the first manufacturer, frame 422 is in the protocol of a third manufacturer, frame 424 is according to the protocol of a fourth manufacturer, and frame 426 is according to the protocol of a fifth manufacturer.

In still another example, the frames are in the format of completely different manufacturers. In other aspects, a manufacturer may have different formats. For instance, a first manufacturer may have a first format and a second format.

In one aspect, once the burst is sent, it is repeatedly transmitted. The repetition is immediate and each new burst includes newly updated information transmitted in each frame of the burst. In another example, once the first burst 402 is sent and then a predetermined time later (e.g., 17 seconds) the second burst is sent. Then, the pattern is repeated.

In one aspect, the burst pattern cannot be changed by the user without the control program being entirely re-programmed. That is, a programming tool cannot be used to change the control program to transmit frames for additional/different manufacturers and cannot be used to select frames to transmit.

Figure 5:
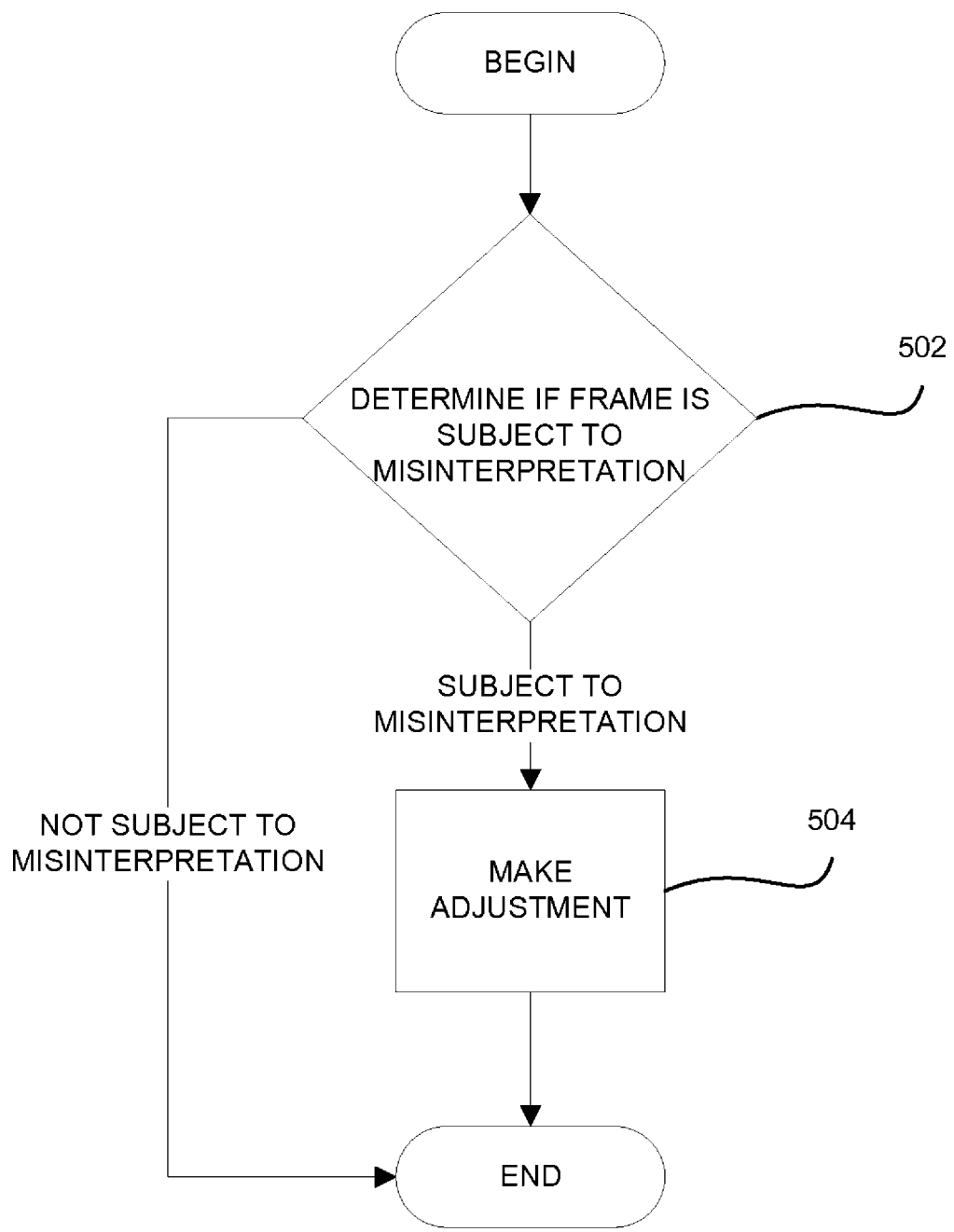
FIG. 5 comprises a flowchart of one approach for preventing protocol misinterpretation in a tire pressure monitoring system.

Referring now to FIG. 5, one example of an approach to avoid misinterpretation of frames in a tire pressure monitoring system is described. At step 502, a determination is made by a tire pressure monitor as to whether a frame to be transmitted according to a first protocol is susceptible to being incorrectly interpreted by a receiver as being transmitted according to a second protocol. This determination may be made if, for example, frames of two manufacturers are similar enough that a receiver expecting a frame from a second manufacturer may confuse a frame of first manufacturer as being from the second manufacturer. In this regard, information may be stored in memory indicating frames of known types that can be misinterpreted along with actions to take when this situation occurs. In one approach, possible misinterpretation concerns are determined on a frame-by-frame basis after each frame is loaded into the transmission buffer.

At step 504, when the frame is determined to be susceptible to an incorrect interpretation, an internal value of the frame is adjusted, and the adjustment is effective to prevent an incorrect interpretation of the frame being transmitted from the tire pressure monitor to a receiver in a vehicle. In some aspects, the adjusting flips at least bit in the frame. The adjusted frame can then be transmitted. In one particular example, a checksum is calculated in the frame according to the checksum determination approach used by the second protocol. Still further, the checksum is compared to a field in the frame that would be the checksum field according to the second protocol. When the checksum equals the value present in the field, a misinterpretation problem exists. When the misinterpretation problem exists, at least one bit is flipped in the frame and the frame is transmitted. Flipping the bit ensures that when a receiver expecting a frame of the second protocol receives the frame (that has been actually transmitted according to the first protocol), the checksum will indicate an invalid frame according to the second protocol and the frame will be ignored by the receiver.

Figure 6:
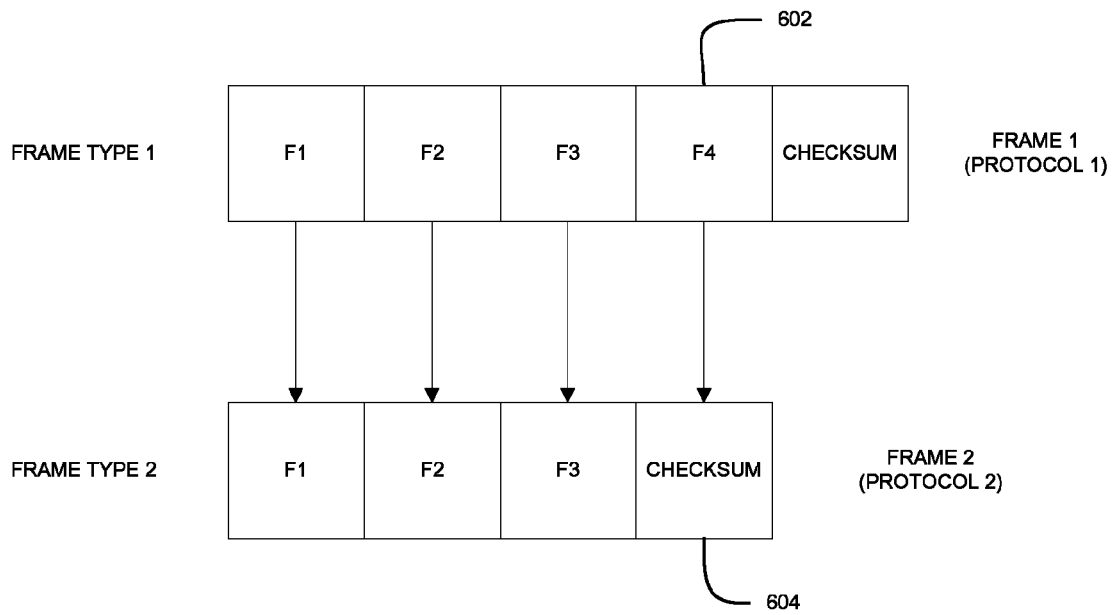
FIG. 6 comprises a block diagram and related flowchart of one approach for preventing protocol misinterpretation in a tire pressure monitoring system.

Referring now to FIG. 6, one example of an approach to avoid misinterpretation of frames in a tire pressure monitoring system is described. A first frame (frame 1) 602 is to be transmitted according to a first protocol (protocol 1). However, as shown in FIG. 6, the first protocol is similar to a second protocol that defines a second frame (frame 2) 604. For instance, it can be seen that the first field F1 of the frame 602 corresponds to the first field F1 of the frame 604; that the second field F2 of the frame 602 corresponds to the second field F2 of the frame 604; and that the third field F3 of the frame 602 corresponds to the third field F3 of the frame 604. A receiver expecting a frame transmitted corresponding to the second protocol (i.e., frame 604) but actually receiving the frame transmitted according to the first protocol (i.e., frame 602) may calculate a checksum on the received frame 602 and if this checksum equals field F4 in frame 602, then the receiver will accept the frame 602 as being of the second protocol. In other words, the receiver expecting to receive a frame according to protocol 2 may misinterpret a frame transmitted according to protocol 1, thereby creating problems at the receiver.

At step 604 the monitor calculates the checksum of frame 602 as it would be calculated for a frame being transmitted according to protocol 1. If the calculation produces a value that equals the value in field F4 of frame 602, a potential misinterpretation problem exists and an adjustment is made in frame 602 so that when this frame is received at a receiver expecting a frame of protocol 2, a misinterpretation is avoided. This can be accomplished, for example, by flipping a bit in the frame 602. By flipping a bit, the checksum computed by the receiver (expecting a frame of protocol 2) will not match the field F4 in frame 602 and the receiver will ignore the frame (since the calculated checksum indicates a corrupted frame). If the original calculation shows that the checksum is different, no bit flipping (or other adjustment) is needed and the receiver (expecting a frame of the second protocol) will simply ignore the frame.

It should be understood that any of the devices described herein (e.g., the programming or activation devices, the tire pressure monitoring devices, the receivers, the transmitters, the sensors, the presentation devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of avoiding protocol misinterpretation in a tire pressure monitoring system, the method comprising:
   determining whether a frame to be transmitted according to a first protocol is susceptible to being incorrectly interpreted by a receiver in a vehicle as being transmitted according to a second protocol;
   when the frame is determined to be susceptible to an incorrect interpretation, adjusting an internal value of the frame, the adjusting being effective to prevent an incorrect interpretation of the frame being transmitted from the tire pressure monitor to the receiver.

2. The method of claim 1 further comprising transmitting the adjusted frame.

3. The method of claim 1 wherein the adjusting flips at least one bit in the frame.

4. The method of claim 1 wherein the determining comprises calculating a checksum in the frame according to a checksum determination approach used by the second protocol.

5. The method of claim 4 wherein the checksum is compared to a field in the frame that would be the checksum field according to the second protocol.

6. The method of claim 5 further comprising when the checksum equals the value of the field, a possible misinterpretation exists.

7. The method of claim 6 further comprising, when the possible misinterpretation exists, at least one bit is flipped in the frame.

8. An apparatus for avoiding protocol misinterpretation in a tire pressure monitoring system, the apparatus comprising:
   a transmission buffer configured to store a frame to be transmitted according to a first protocol;
   a transmitter coupled to the transmission buffer;
   a controller coupled to the transmission buffer and the transmitter, the controller configured to determine whether the frame to be transmitted according to the first protocol is susceptible to being incorrectly interpreted by a receiver as being transmitted according to a second protocol, and when the frame is determined to be susceptible to an incorrect interpretation, to adjust an internal value of the frame, the adjustment being effective to prevent an incorrect interpretation, the controller further configured to effect transmission of the frame from the transmission buffer via the transmitter.

9. The apparatus of claim 8 wherein the controller is configured to adjust by flipping at least one bit in the frame.

10. The apparatus of claim 8 wherein the controller is configured to calculate a checksum in the frame according to a checksum determination approach used by the second protocol.

11. The apparatus of claim 10 wherein the controller is configured to compare the checksum to a field in the frame that would be the checksum field according to the second protocol.

12. The apparatus of claim 11 wherein the controller is configure to when the checksum equals the value of the field, determine that a possible misinterpretation exists.

13. The apparatus of claim 12 wherein the controller is configured to, when the possible misinterpretation exists, flip at least one bit in the frame.

14. A computer usable medium having a computer readable program code embodied therein, said computer readable program code adapted to be executed to implement a method of avoiding protocol misinterpretation in a tire pressure monitoring system, the method comprising:

determining whether a frame to be transmitted according to a first protocol is susceptible to being incorrectly interpreted by a receiver as being transmitted according to a second protocol;

when the frame is determined to be susceptible to an incorrect interpretation, adjusting an internal value of the frame, the adjusting being effective to prevent an incorrect interpretation of the frame being transmitted from the tire pressure monitor to a receiver in a vehicle.

15. The computer usable medium of claim 14 wherein the method further comprises transmitting the adjusted frame.

16. The computer usable medium of claim 14 wherein the method further comprises adjusting flips at least one bit in the frame.

17. The computer usable medium of claim 14 wherein the determining of the method further comprises calculating a checksum in the frame according to a checksum determination approach used by the second protocol.

18. The computer usable medium of claim 17 wherein the checksum is compared to a field in the frame that would be the checksum field according to the second protocol.

19. The computer usable medium of claim 18 wherein the method further comprises when the checksum equals the value of the field, a possible misinterpretation exists.

20. The computer usable medium of claim 19 wherein the method further comprises, when the possible misinterpretation exists, flipping at least one bit in the frame.

21. A computer usable medium having a computer readable program code embodied therein, said computer readable program code adapted to configure a controller of an apparatus for avoiding protocol misinterpretation in a tire pressure monitoring system, such that the following means are formed on the controller:

means for determining whether a frame to be transmitted according to a first protocol is susceptible to being incorrectly interpreted by a receiver as being transmitted according to a second protocol;

means for, when the frame is determined to be susceptible to an incorrect interpretation, adjusting an internal value of the frame, the adjusting being effective to prevent an incorrect interpretation of the frame being transmitted from the tire pressure monitor to a receiver in a vehicle.

* * * * *